US005828351A

United States Patent [19]

Wu

[11] Patent Number: 5,828,351

[45] Date of Patent: Oct. 27, 1998

[54] METHOD AND APPARATUS OF ADJUSTING MONITOR DISPLAY

[75] Inventor: Tsung-Hsun Wu, Taoyuan, Taiwan

[73] Assignee: ACER Peripherals, Inc., Taichung, Taiwan

[21] Appl. No.: 814,017

[22] Filed: Mar. 10, 1997

[30] Foreign Application Priority Data

Jan. 16, 1997 [TW] Taiwan .......... 86100413

[51] Int. Cl.[6] .......... G09G 1/06; G09G 5/00; H04N 5/57; H04N 5/14

[52] U.S. Cl. .......... 345/11; 345/3; 345/10; 345/204; 348/678; 348/686; 348/576

[58] Field of Search .......... 345/204, 212, 345/213, 3, 11, 14, 156, 150; 348/569, 565, 673, 687, 678, 674, 671, 649, 625, 577, 576, 725, 805, 686

[56] References Cited

U.S. PATENT DOCUMENTS

| | | | |
|---|---|---|---|
| 4,991,023 | 2/1991 | Nicols | 345/213 |
| 5,173,778 | 12/1992 | Sasaki et al. | 348/569 |
| 5,237,417 | 8/1993 | Hayashi et al. | 348/569 |
| 5,270,821 | 12/1993 | Samuels | 345/156 |
| 5,384,576 | 1/1995 | Tashiro et al. | 345/3 |
| 5,493,317 | 2/1996 | Kim | 345/213 |
| 5,528,304 | 6/1996 | Cherrick et al. | 348/565 |
| 5,550,556 | 8/1996 | Wu et al. | 345/14 |
| 5,589,853 | 12/1996 | Fujiki | 345/150 |
| 5,602,567 | 2/1997 | Kanno | 345/11 |
| 5,654,743 | 8/1997 | Hu et al. | 345/213 |
| 5,703,661 | 12/1997 | Wu | 345/212 |

*Primary Examiner*—Jeffery Brier
*Assistant Examiner*—David L. Lewis
*Attorney, Agent, or Firm*—Pillsbury Madison & Sutro LLP

[57] ABSTRACT

A method and apparatus of adjusting the display of the monitor by modifying the parameter values of the adjustable display functions. When the user begins to press the select key on the control panel, the display of the monitor is altered by recursively varying the parameter value of the selected display function from the maximum to the minimum, for indicating the type of the display function to be selected. Such a dynamic display can be obtained by using the microcontroller of the monitor. The monitor will exhibit the display effect of the display function to be selected. Therefore, the user can realize the display effect of these display functions, without having to memorize the simplified figures associated with these display functions. Then the user can adjust the display of the monitor through depressing the adjust key on the control panel.

12 Claims, 5 Drawing Sheets

METHOD AND APPARATUS OF ADJUSTING MONITOR DISPLAY

BACKGROUND OF THE INVENTION

1. Field of the Invention

The present invention in general relates to a monitor, more specifically, to a method and apparatus of adjusting a monitor display by modifying parameters of various display functions. These display functions are parameters that can be adjusted by users to exhibit the desired display, such as brightness, contrast, horizontal size H-size) horizontal phase (H-phase), vertical size (V-size), vertical center (V-center), and so on.

2. Description of the Prior Art

Display devices, such as commercial televisions and computer monitors, generally have some adjustable display functions that are reserved for users to adjust the aspect shown in the display devices as desired. In the computer monitors, for example, most of monitor sets can provide the display functions of brightness, contrast, H-size, H-phase, V-size and V-phase. For professional monitor sets, additional adjustable functions, such as pin-cushion, trapezoid, parallel and tilt, may also be provided for users.

FIG. 1 (Prior Art) illustrates a first conventional approach to adjust the display of the computer monitor. In the front end of monitor 1 there are screen zone 10 for display and control panel 20. Display region 12 in screen zone 10 is defined as a region scanned by an internal cathode ray tube (CRT) of monitor 1, which is controlled by an internal deflection display circuit of monitor 1. Control panel 20 includes a key region 22 and an indicator region 24, as shown in FIG. 1. Generally, there are at least three key buttons in key region 22. In FIG. 1, the key button denoted as "S" serves as a select key, which is used for selecting one of the display functions to be adjusted. The key buttons denoted as "<<" and ">>" serve as an adjust key, which is used for modifying the parameter value of the selected display function. Indicator region 24 includes a plurality of light-emitting devices (LEDs) and simplified figures attached to these LEDs for prompting the display functions of the attached LEDs, respectively. In FIG. 1, these simplified figures, from the left to the right, represent the display functions of brightness, contrast, V-size, V-center, H-size, H-center, pin-cushion and trapezoid, respectively. During practical operation, only one of these LED lamps is lit up, representing the selected display function. Referring to the lit-up LED indicator, the user may choose one display function as their intention by continuously pressing the select key. After selecting the desired display function to be adjusted, users may modify the current parameter value of the selected display function by pressing the "increasing" or "decreasing" adjust keys. At this time, display region 12 exhibits the display effect of the modified parameter value of the selected display function. As shown in FIG. 1, the LED lamp representing the display function of V-size is lit up, and, therefore, the vertical size of display region 12 is varied according to the adjustment amount input by pressing the adjust key.

FIG. 2 (Prior Art) illustrates a second conventional approach to adjust the display of computer monitors. In FIG. 2, a functional display region 14 on display region 12 is substituted for the indicator region 24 in FIG. 1, to point out the selected display function. Functional display region 14 is generally output by an on-screen-display (OSD) integrated circuit (IC), which is controlled by the microcontroller of the monitor and overlays an image of functional display region 14 on display region 12. The operational sequence and the response messages in this adjustment scheme are the same as those of the former one shown in FIG. 1. When the user presses the select key (the button denoted as "S" in key region 22), the functional display region 14 is displayed on display region 12 by the OSD IC, as shown in FIG. 2. When the user continues to press the select key, these simplified figures on functional display region 14 are sequentially inverted or blink, indicating the display function chosen by the user. When the user decides on the display function to be adjusted and presses the adjust keys (the buttons denoted as "<<" and ">>") , the current parameter value of the selected display function can be modified as the user desires. During the adjustment process, display region 12 may exhibit the real-time display according to the adjusted amount of the parameter value to exhibit the adjustment effect. In addition, a bar diagram (not shown) generated by the OSD IC can also be used to tell the user the current and modified parameter values of the selected display function. Basically, in the above-indicated approaches of adjusting the display of the monitor, the user can realize the display function to be selected and the display effect caused by modifying the parameter value during the adjustment process.

However, in utilizing such approaches an additional LED indicator circuit or OSD IC must be included in the conventional computer monitors. It is evident that the fabrication cost of these conventional monitors is increased due to these additional parts.

In addition, most of the monitor users very seldom apply these adjustment approaches to regulate the monitor display. Therefore, it is very difficult for these users to memorize the display effects associated with these simplified figures shown in the control panel or the functional display region on the screen. Usually, the user must repeatedly input a small amount of adjustment for each adjustable display function, realizing their display effects by viewing the practical display of the monitor. Such an operation manner is inconvenient for the user.

SUMMARY OF THE INVENTION

Therefore, an object of the present invention is to provide a method and apparatus of adjusting the display of the monitor, which can decrease the number of the necessary parts for the monitor and thus reduce the fabrication cost.

Another object of the present invention is to provide a method and apparatus of adjusting the display of the monitor, which can build a user-friendly interface for the user to modify the parameter values of the display function.

The present invention achieves the above-indicated objectives by providing a method of adjusting the display of the monitor by modifying the parameter values of the adjustable display functions. In the control panel of the monitor there exists are select key and an adjust key, the functions of which are the same as those of the prior art. As the user begins to press the select key, the monitor enters a display-function simulation mode. In this mode, the user may use the select key to choose one display function that requires adjusting. At this time, the display of the monitor is altered by continuously varying the parameter value of this selected display function, for indicating the type of the selected display function. Such a dynamic display can be obtained by using the microcontroller of the monitor. First, the monitor microcontroller fetches the original parameter value of the selected display function from the memory device as an initial value. The current parameter value of the selected display function is continuously increased and transmitted to a deflection control circuit corresponding to the selected display function to alter the display of the monitor, until the increased parameter value reaches a first predefined value, such as the maximum value of this parameter. Then the parameter value is continuously decreased and transmitted to the corresponding deflection circuit, until the decreased parameter value reaches a second predefined value, such as the minimum value of this parameter. Such an operation is alternately and recursively executed by the monitor controller, and thus the monitor will exhibit the display effect of the selected display function.

When the user begins to press the adjust key, the display-function simulation mode is terminated. At this time, the user can intentionally press the adjust key to modify the parameter value of the selected display function. During the adjustment process, the controller can continuously detect the select key and the adjust key. If the select key and the adjust key were not pressed within a predefined period, the monitor then returns to the normal display according to the original parameters stored in the memory device.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

In the display adjustment approach of the present invention, the microcontroller of the monitor is loaded with a control program, which can simulate the display effect for the selected display function. Therefore, the user obviously realizes the selected display function, and does not need to memorize the display effect of the simplified figures shown in the control panel or the overlaid functional OSD menu. In addition, the LED lamps and the OSD IC can be removed from the monitor, which may reduce the fabrication cost and complexity. The preferred embodiment in accordance with the present invention is described in detail below by referring to the accompanying drawings.

Figure 1:
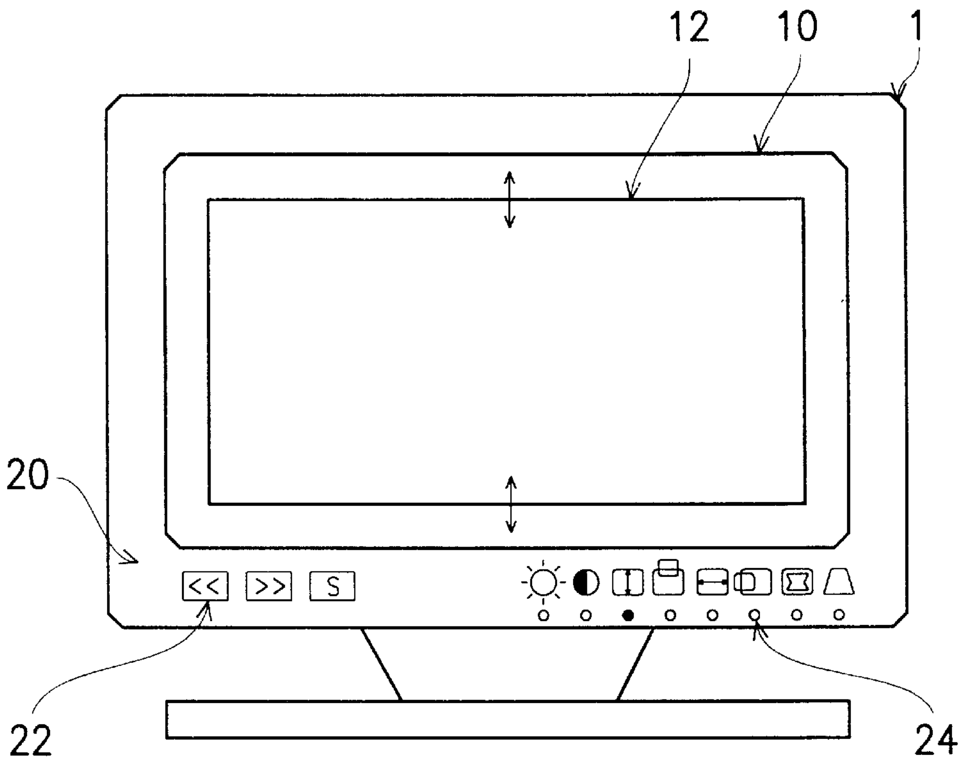
FIG. 1 (PRIOR ART)
FIG. 1 (Prior Art) schematically illustrates the first conventional approach to adjust the display of the computer monitor.
Figure 2:
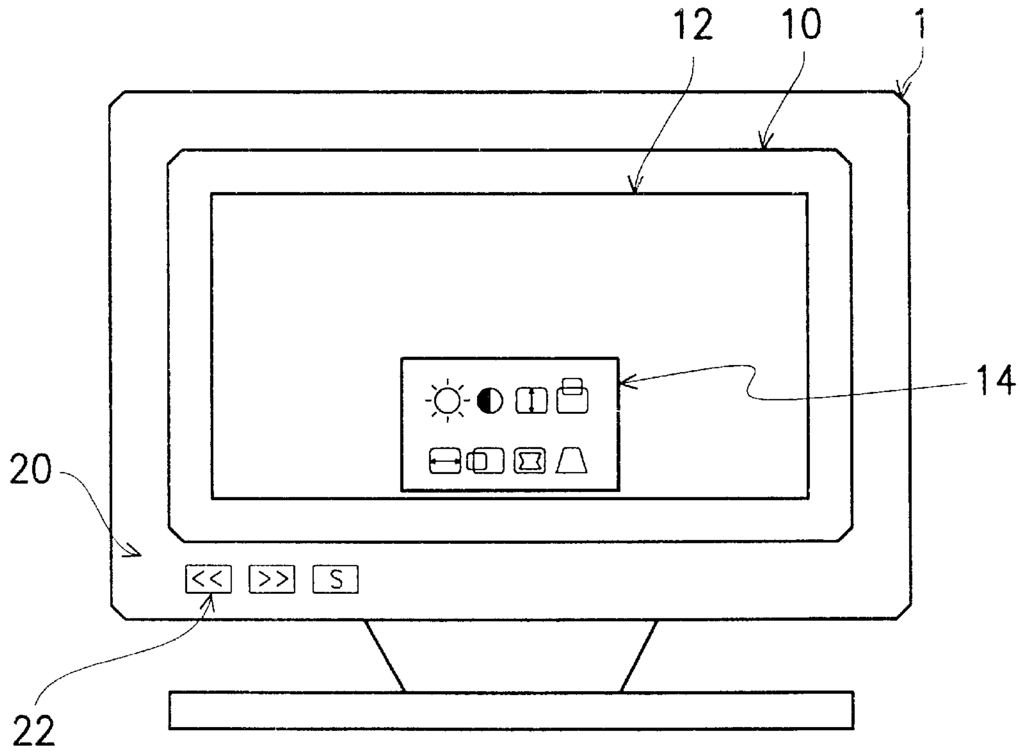
FIG. 2 (PRIOR ART)
FIG. 2 (Prior Art) schematically illustrates the second conventional approach to adjust the display of the computer monitor.
Figure 3:
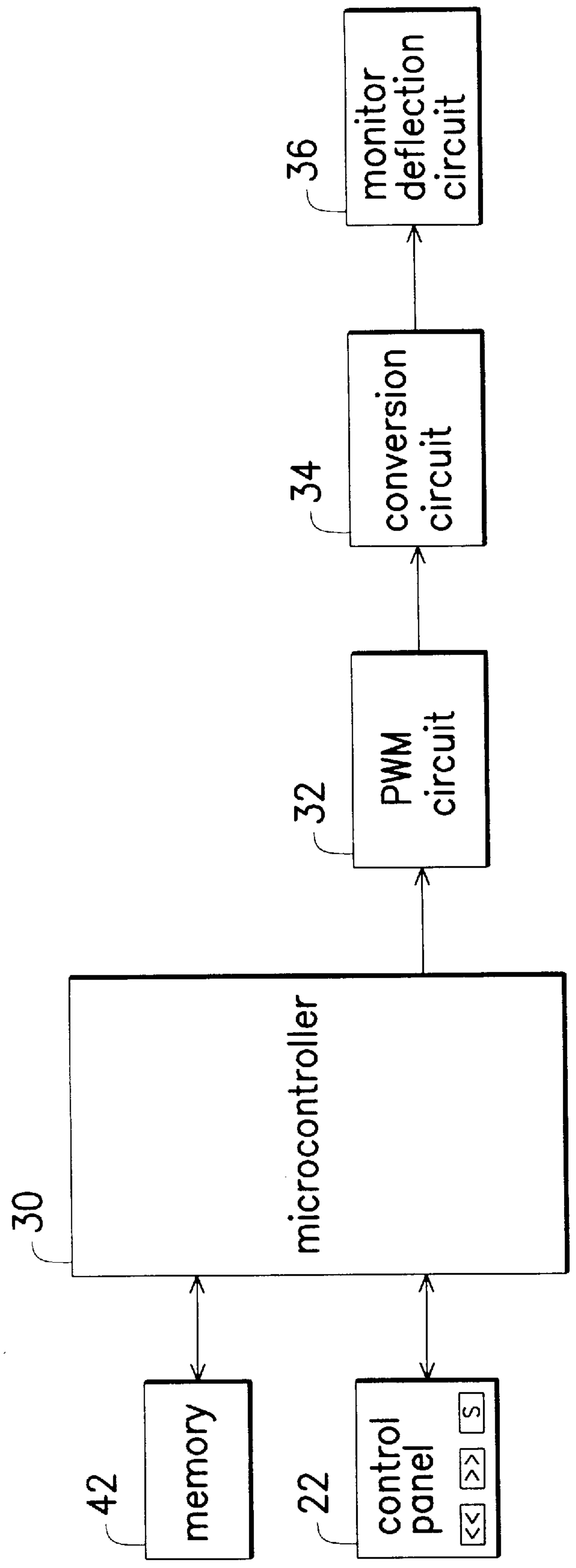
FIG. 3 shows a block diagram of an adjustment device for adjusting the display functions of computer monitors in accordance with the embodiment of the present invention.

FIG. 3 shows a block diagram of the adjustment device for adjusting the display functions in accordance with this embodiment. In FIG. 3, the adjustment device includes memory 42, control panel 22, microcontroller 30, pulse-width modulator (PWM) circuit 32, conversion circuit 34 and monitor deflection circuit 36. Memory 42 is used for holding the parameter values of the display functions set by the factory and by the user. Control panel 22 includes a select key "S" and two adjust keys "<<" and ">>". The select key is used for choosing the display function that requires adjustment, which is sequentially selected by continuously pressing the select key. The adjust keys are used for modifying the practical parameters of the selected display function. Microcontroller 30 generates a control signal according to the selected display function set by the select key and the adjustment amount set by the adjust keys. The control signal is converted into a DC voltage by PWM modulator 32 and conversion circuit 34 and then transmitted to deflection circuit 36 to alter the display of the monitor.

The control program executed by microcontroller 30 dominates the adjustment process. When microcontroller 30 recognizes the situation of pressing the select key, then it generates increasing or decreasing parameter values for the selected display function. These varied parameter values are continuously transmitted to deflection circuit 36 through PWM circuit 32 and conversion circuit 34, to exhibit the display effect of the selected display function. In addition, when microcontroller 30 recognizes the situation of pressing the adjust key, it then outputs the original parameter values to the deflection circuit and waits for subsequent adjusting operations. In other words, as the user is choosing the display function to be adjusted, the display screen will exhibit the display effect associated with the currently selected display function. As the user decides on a display function that requires adjustment and intentionally modifies its parameter value, the monitor will exhibit the display assciated with the modified parameter values.

It should be noted that the total number of the PWM circuits and the conversion circuits, as shown in FIG. 3, depends on the number of the adjustable display functions. In other words, each pair of PWM circuits and conversion circuits handles one of the display functions. Their operation is described as follows. The PWM circuit 32 receives the control signal from the microcontroller and generates a PWM signal in accordance with the parameter value attached to the control signal. The duty cycle of the generated PWM signal is proportional to the parameter value. In other words, the bigger the parameter value is, the longer the corresponding duty cycle is. The conversion circuit 34 then converts the PWM signal into a DC voltage for directly controlling the deflection circuit. The conversion circuit 34 can be implemented by a simple integration circuit, in which the output DC voltage is proportional to the duty cycle of the input PWM signal. These DC voltages representing different display functions inputted to the different portions of the deflection circuit 36, by adjusting the display of the monitor. However, these PWM circuits and conversion circuits also can be merged into the microcontroller for convenience.

Figure 4:
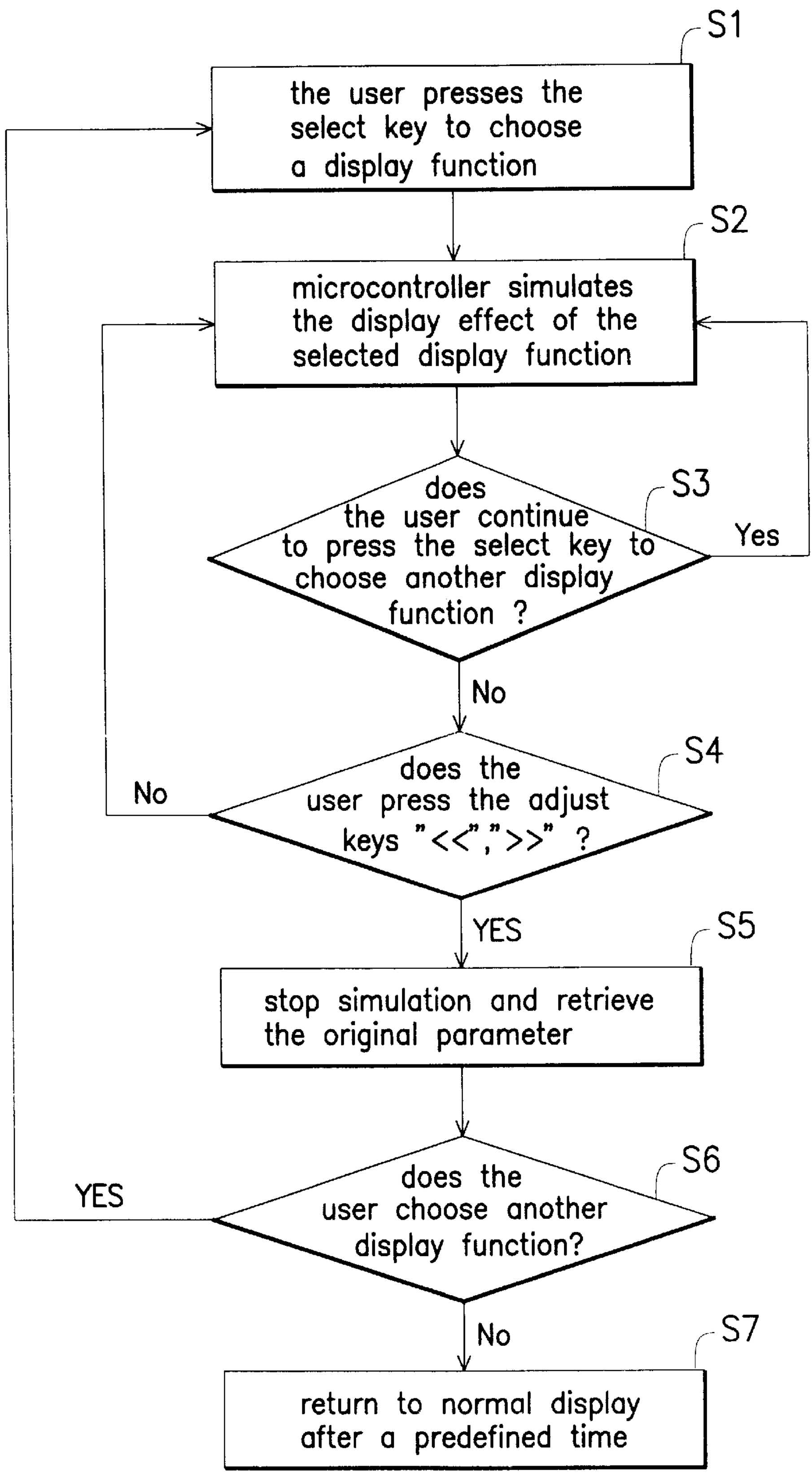
FIG. 4 is a flowchart showing an adjustment approach for adjusting the display of computer monitors in accordance with the embodiment of the present invention.

FIG. 4 is a flowchart showing the processing procedure of the control program executed by microcontroller 30. In FIG. 4, when the user begins to press the select key on control panel 20 to select the display function to be adjusted (S1), the monitor enters a display-function simulation mode. In this mode, the display of the monitor is altered by continuously varying the parameter value of the currently selected display function, for indicating the type of the display function to be selected (S2). At this time, the user can continue to press the select key to choose another display function (S3), or press the adjust key to modify the parameter value of the currently selected display function (S4).

Before any adjust key is pressed, microcontroller 30 is still in the display-function simulation mode and continues to simulate he display effect of the currently selected display function. Next, as the user begins to press any adjust key, microcontroller 30 then enters a display-function adjust mode, in which the simulation operation is ceased and the original parameter value of the selected display function is sent to the deflection circuit 36 (S5). Now the user may modify the parameter value of the selected display function by pressing the buttons "<<" and ">>". In addition, the user may also press the select key to choose another display function to adjust other aspects of the display (S6). In the display-function adjust mode, microcontroller 30 stores the modified parameter values back to memory 42 if the adjust key is not pressed within a predefined period. If the select key and the adjust keys are not pressed within a certain period, the monitor returns to the normal display state (S7).

Figure 5:
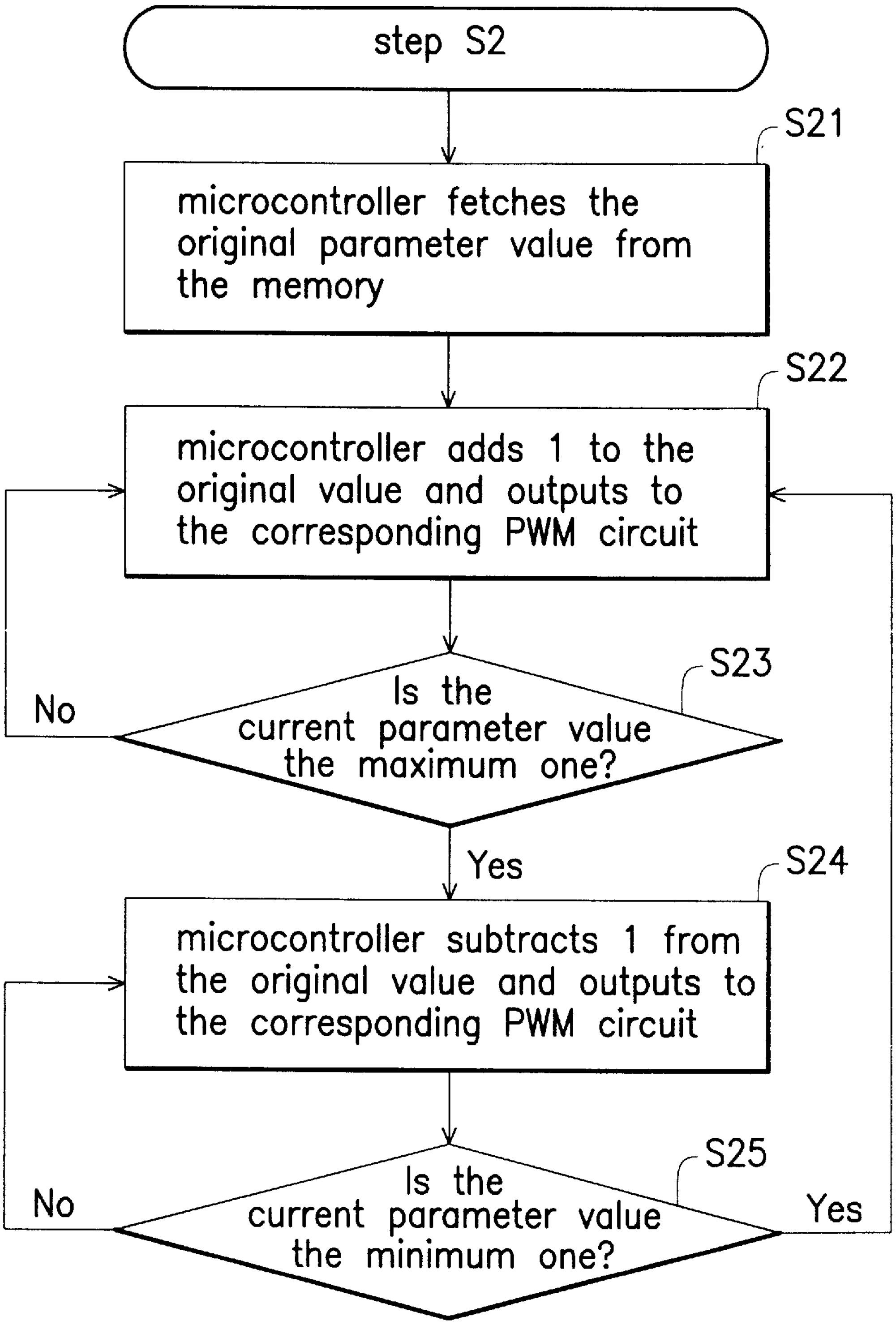
FIG. 5 is a flowchart of showing the detailed steps of the display-function simulation mode in FIG. 4.

FIG. 5 shows the detailed steps of the display-function simulation mode (S2) in FIG. 4 in accordance with this embodiment. First, microcontroller 30 fetches the original parameter value from memory 42 as an initial value (S21). The fetched parameter value is continuously increased by one and transmitted to the PWM circuit corresponding to the selected display function (S22), until the increased parameter value reaches the maximum value of this parameter (S23). Meanwhile, the display of the monitor exhibits a dynamic variation related to the increasing parameter of the selected display function. After the parameter value reaches the maximum one, microcontroller 30 subtracts one from the fetched parameter value and continuously transmits the operation result to the PWM circuit corresponding to the selected display function (S24), until the decreased parameter value reaches the minimum value of this parameter (S25) . Steps S22–S25 are recursively executed by microcontroller 30, arid thus the monitor will exhibit the display effect of the display function to be selected. It is understood by those skilled in the art that the initial value, the maximum value and the minimum value in the above description do not limit the scope of the present invention. Other values suitable to being used in the recursive loop of FIG. 5 also conform to the present invention.

In step S5 of the flowchart shown in FIG. 4, the parameter value of the selected display function may be modified by taking the following steps. First, microcontroller 30 fetches the original parameter value of the selected display function from memory 42 and outputs the fetched value to the monitor deflection circuit 36. Therefore, the simulation operation performed in step S2 is terminated. During the adjustment process, microcontroller 30 timely transmits the modified parameter value to the monitor deflection circuit 36 for demonstrating the display effect of the modified parameter value. Therefore, the user may realize the display effect of the modified parameter during the adjustment process. Finally, microcontroller 30 stores the modified parameter value of the selected display function into memory 42 after finishing this procedure.

Figure 6A:
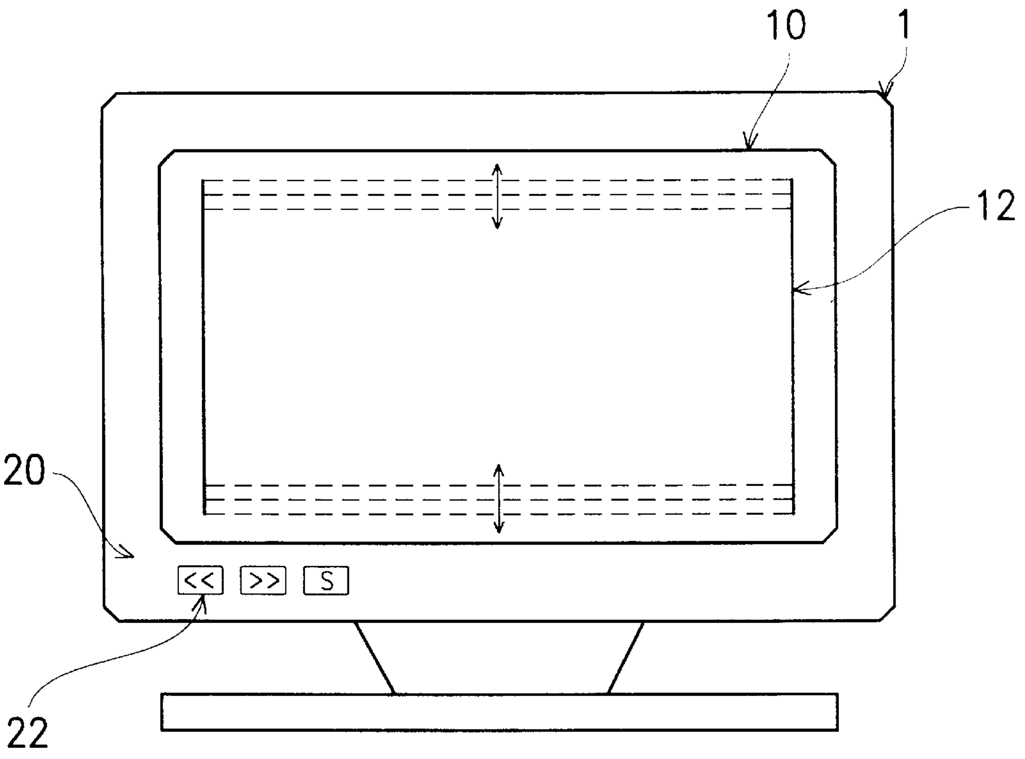
FIG. 6A and FIG. 6B illustrate an example of the display adjustment procedure in accordance with the present invention.
Figure 6B:
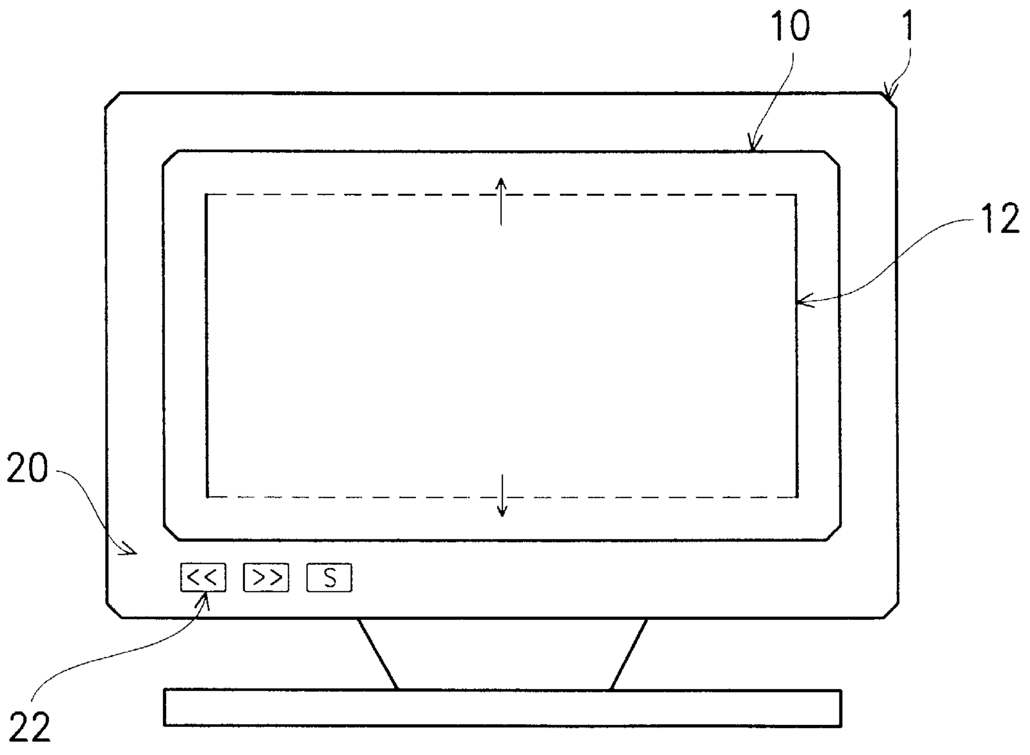

An example illustrating the practical situation of adjusting the display of the monitor in accordance with this embodiment is described as follows. FIG. 6A and FIG. 6B show the display of the monitor during the display adjustment procedure of the present embodiment. More particularly, FIG. 6A and FIG. 6B illustrate the practical monitor screen in Step S2 and Step S5 of the procedure shown in FIG. 4, respectively. Note that in control panel 20 there is no LED lamp in the embodiment. When the user chooses the display function for adjusting the vertical size of display region 12, monitor 1 exhibits a vertical swing display region, as shown in FIG. 6A, to illustrate the display effect of this selected display function. At this time, the user may press the select key to adjust the vertical size of display region 12. Monitor 1 then exhibits the adjusted display effect according to the input parameter value during the adjustment procedure, as shown in FIG. 6B. Therefore, monitor users do not need to memorize the meanings of the simplified figures attached to these display functions. In addition, monitor manufacturers eliminate the LED lamps or the OSD ICs from the structure of monitors, and thus the fabrication cost is reduced and the monitor configuration is simplified.

The foregoing description of preferred embodiments of the present invention has been provided for the purposes of illustration and description. It is not intended to be exhaustive or to limit the invention to the precise forms disclosed. Many modifications and variations, such as including an OSD IC in the monitor, will be apparent to practitioners skilled in this art. The embodiments were chosen and described to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of adjusting a display of a monitor, comprising the steps of:

selecting a display function controlling the display by pressing a select key on the monitor;

automatically varying a parameter value associated with the selected display function to alter the display in response to the selecting step, for demonstrating the effect of the selected display function on the monitor;

ceasing to vary the parameter value of the selected display function when an adjust key used for adjusting the parameter value of the selected display function is pressed; and modifying the parameter value of the selected display function by pressing the adjust key.

2. The method of adjusting the display of the monitor as recited in claim 1, wherein in the step of continuously varying the parameter value of the selected display function to alter the display of the monitor comprising the steps of:

continuously increasing the parameter value of the selected display function and transmitting the increased parameter value to a control circuit corresponding to the selected display function to alter the display of the monitor, until the increased parameter value reaches a first predefined value; and continuously decreasing the parameter value of the selected display function and transmitting the decreased parameter value to the corresponding circuit to alter the display of the monitor, until the decreased parameter value reaches a second predefined value, the first predefined value being higher than the second predefined value.

3. The method of adjusting the display of the monitor as recited in claim 2, wherein the steps of increasing and decreasing the parameter value of the selected display function are alternately and recursively executed by a monitor controller.

4. The method of adjusting the display of the monitor as recited in claim 2, wherein the first predefined value is the maximum parameter value of the selected display function.

5. The method of adjusting the display of the monitor as recited in claim 2, wherein the second predefined value is the minimum parameter value of the selected display function.

6. The method of adjusting the display of monitor as recited in claim 1, further comprising a step of displaying the current parameter value of the selected display function on the display of the monitor by an on-screen display (OSD) circuit of the monitor.

7. The method of adjusting the display of the monitor as recited in claim 1, in the step of modifying the parameter value of the selected display function further comprising the steps of:

fetching an original parameter value of the selected display function from a memory device;

transmitting the original parameter value to a control circuit corresponding to the selected display function;

transmitting the modified parameter value to the control circuit corresponding to the selected display function, for showing the display effect of the modified parameter value; and storing the modified parameter value of the selected display function in the memory device after finishing modification of the parameter value.

8. The method of adjusting the display of the monitor as recited in claim 1, further comprising a step of ceasing to alter the display of the monitor when the select key and the adjust key are not pressed within a predefined period.

9. An apparatus of adjusting a display of a monitor, comprising:

a means for storing parameter values corresponding to a plurality of display functions that control the display;

a control panel, having a select key for selecting one of the display functions and an adjust key for modifying the parameter value of the display function selected by the select key;

a controller for generating a control signal in accordance with the display function selected by the select key and the modified parameter value set by the adjust key, wherein the controller, in response to pressing the select key, automatically varies the parameter value of the selected display function and modulates the control signal based on the varied parameter so as to alter the display in accordance with the selected display function, and in response to pressing the adjust key, ceases to vary the parameter value of the selected display function; and a display circuit for altering the display of the monitor in response to the control signal from said controller.

10. The apparatus of adjusting the display of the monitor as recited in claim 9, wherein the controller ceases to vary the parameter value of the selected display function when the select key and the adjust key are not pressed within a predefined period.

11. The apparatus of adjusting the display of the monitor as recited in claim 9, wherein the controller updates the storing means according to the modified parameter value of the selected display function after finishing modification of the parameter value.

12. The apparatus of adjusting the display of the monitor as recited in claim 9, further comprising:

a plurality of pulse-width modulators, corresponding to the display functions, respectively, for generating pulse-width modulated signals in responsive to the control signal from said controller, the duty cycle of each pulse-width modulated signal being proportional to the corresponding parameter value attached to the control signal; and a plurality of converting circuits, corresponding to the pulse-width modulator, respectively, for converting the pulse-width modulated signals from the pulse-width modulator into DC voltages that control the display circuit.

* * * * *